United States Patent
Weber

(10) Patent No.: US 7,878,386 B2
(45) Date of Patent: Feb. 1, 2011

(54) METHOD AND DEVICE FOR HEAT TREATMENT, ESPECIALLY CONNECTION BY SOLDERING

(75) Inventor: Stefan Weber, Wertheim (DE)

(73) Assignee: Pink GmbH Thermosysteme, Wertheim (DE)

( * ) Notice: Subject to any disclaimer, the term of this patent is extended or adjusted under 35 U.S.C. 154(b) by 0 days.

(21) Appl. No.: 12/300,851

(22) PCT Filed: Apr. 27, 2007

(86) PCT No.: PCT/DE2007/000758

§ 371 (c)(1),
(2), (4) Date: Nov. 14, 2008

(87) PCT Pub. No.: WO2007/137547

PCT Pub. Date: Dec. 6, 2007

(65) Prior Publication Data

US 2009/0173771 A1   Jul. 9, 2009

(30) Foreign Application Priority Data

May 29, 2006 (DE) .................. 10 2006 025 193
Jun. 26, 2006 (DE) .................. 10 2006 029 593

(51) Int. Cl.
*B23K 31/02* (2006.01)
*B23K 37/00* (2006.01)

(52) U.S. Cl. ............... 228/221; 228/9; 228/42; 228/46; 228/233.2; 228/234.1

(58) Field of Classification Search ............ None
See application file for complete search history.

(56) References Cited

U.S. PATENT DOCUMENTS

| | | | |
|---|---|---|---|
| 3,618,919 A | | 11/1971 | Beck |
| 3,756,489 A | * | 9/1973 | Chartet ............... 228/43 |
| 3,882,596 A | * | 5/1975 | Kendziora et al. .......... 228/200 |
| 4,932,864 A | | 6/1990 | Miyabe |
| 5,172,847 A | * | 12/1992 | Barten et al. ............... 228/18 |
| 5,195,673 A | * | 3/1993 | Irish et al. ................. 228/18 |
| 5,341,978 A | * | 8/1994 | Halstead et al. ............. 228/42 |
| 5,433,368 A | * | 7/1995 | Spigarelli ................. 228/8 |
| 6,386,422 B1 | * | 5/2002 | Cheng et al. ............... 228/46 |
| 6,533,577 B2 | * | 3/2003 | Anderson et al. ........... 432/128 |
| 6,796,483 B1 | | 9/2004 | Weber et al. |
| 7,150,387 B2 | * | 12/2006 | Yamaguchi et al. .......... 228/46 |
| 2003/0007921 A1 | | 1/2003 | Matsumoto et al. |
| 2005/0173497 A1 | | 8/2005 | Dokkedahl |

FOREIGN PATENT DOCUMENTS

| | | |
|---|---|---|
| DE | 299 24 154 U1 | 4/2002 |
| JP | 03106562 A | 5/1991 |
| JP | 08295926 A | 11/1991 |
| WO | 2006111328 A | 10/2006 |

OTHER PUBLICATIONS

"PCT International Search Report dated Sep. 18, 2007 for PCT/DE2007/000758, from which the instant application is based," 5 pgs.

* cited by examiner

*Primary Examiner*—Kiley Stoner
(74) *Attorney, Agent, or Firm*—Fredrikson & Byron, P.A.

(57) ABSTRACT

The present invention relates to a method and device (10) for the temperature treatment of workpieces (19) or components, in particular for producing a solder connection between a solder material and at least one component or workpiece used as a solder material carrier by means of melting the solder material arranged on the solder material carrier, where a heating and, in a subsequent method step, a cooling of at least one component is carried out in a process chamber (13, 14) which is sealed from the surrounding area, wherein the heating and the cooling of the component (19) are carried out in two chamber regions (13, 14) of the process chamber (12), which can be separated from one another by means of a condensation device (15).

15 Claims, 3 Drawing Sheets

METHOD AND DEVICE FOR HEAT TREATMENT, ESPECIALLY CONNECTION BY SOLDERING

RELATED APPLICATIONS

This application is a 35 U.S.C. 371 national stage filing from International Application No. PCT/DE2007/000758 filed Apr. 27, 2007, which claims priority to German Application No. 10 2006 029 593.5 filed Jun. 26, 2006 and to German Application No. 10 2006 025 193.8 filed May 29, 2006, the teachings of which are incorporated herein by reference.

The present invention relates to a method for the heat treatment of workpieces or components, in particular for producing a solder connection between a solder material and at least one component or workpiece used as a solder material carrier by means of melting the solder material arranged on the solder material carrier, where a heating and, in a subsequent method step, a cooling of at least one component is carried out in a process chamber which is sealed from the surrounding area. Furthermore, the invention relates to a device which is suitable for carrying out the method.

In known methods of the above-mentioned type, where a heating as well as a cooling of the component to be soldered is carried out in a single process chamber, a cleaning of the process chamber in intervals of often only a relatively small amount of soldering cycles is necessary for the permanent operation of a corresponding device. Due to the relatively high temperature drop between a heating and a cooling zone, the volatile evaporations of the solder material occurring in response to the heating process condense in the colder cooling zone and form a precipitation in particular on the components and devices arranged in the cooling zone, said precipitation having to be removed by means of the cleaning process. Due to the cleaning process, which must thus be carried out repeatedly, the operation of the devices which operate according to the known methods must be interrupted again and again. In practice, this leads to considerable production losses.

The present invention is thus based on the object of proposing a method and a device, the operation of which can be carried out in a substantially continuous manner without the known brief cleaning intervals, thus enabling a higher production output.

To attain this object, the method according to the invention encompasses the features of claim 1. In the method according to the invention, the heating and the cooling of the component are carried out in two chamber regions of the process chamber, which can be separated from one another by means of a condensation device.

A precipitation of the volatile evaporations on the condensation device, which is generated in response to the heating process, takes place by means of the condensation device, which is effective between the chamber regions, said condensation device acting quasi like a protective shield and thus preventing a condensation in the cooled chamber region and thus in particular on one of the cooling devices which are arranged in this chamber region.

As a matter of principle, the method according to the invention can be generally used for the temperature application on workpieces or components in response to the heat treatment, such as tempering, annealing and the like, for example. A particular area of application lies in the field of the production of solder connections which are carried out by means of soldering paste, such as, for example, in the field of the production of electronic components and assembly groups.

The production output and thus the effectiveness of the method according to the invention can be further increased if, according to a particular advantageous variant of the method, the heating is carried out by means of a heating device and the cooling is carried out by means of a cooling device, which are operated in each case at a substantially constant temperature. In so doing, time losses, which occur when the method is carried out and which are caused by heating processes and cooling processes, respectively, until the desired heating or cooling temperature has been reached, are avoided.

It furthermore turns out to be particularly advantageous if the condensation device is moved from a supply position into a separating wall position which separates the chamber regions prior to the heating of the solder material carrier for the purpose of separating the chamber regions. Through this, it is possible, after the heating process has been carried out in the chamber region used for heating, with the condensation device being arranged in the supply position, to transfer the solder material carrier and the component, respectively, into the cooling chamber region and to subsequently reposition the condensation device into its separating wall position so that, during the cooling of the solder material carrier in the cooling chamber region, considerable temperature losses do not occur in the heating chamber region, which is separated from the cooling chamber region by means of the condensation device.

The effect of the condensation device, thus in particular the condensation output, can be considerably supported and intensified, respectively, by means of cooling the condensation device. A particularly simple realization of the cooling of the condensation device becomes possible if the condensation device is cooled during the arrangement in the supply position, where the condensation device is substantially located outside of the immediate impact region of the heating chamber region.

The barrier or shield effect of the condensation device for preventing a condensate precipitation in the cooling chamber region can be effectively supported in that a vacuum is applied to the heating chamber region during the heating of the solder material carrier in the heating chamber region, which is separated from the cooling chamber region by means of the condensation device. If required, a vacuum can also be applied to the entire process chamber.

If inert gas or reducing protective gas is applied to the cooling chamber region and/or the heating chamber region while a vacuum is applied to the heating chamber region, the solder partners can be effectively protected from atmospheric oxygen or existing oxidized surfaces can be forced open. Furthermore, a gas flow, which also counteracts a condensate precipitation in the cooling chamber region, is made possible in the process chamber in particular when a protective gas is applied to the cooling chamber region and when a vacuum is applied to the heating chamber region at the same time.

To counteract a temperature gradient in the solder material carrier during the heating in the heating chamber region as far as possible, it proves to be advantageous if the solder material carrier is arranged between the heating device and an auxiliary heating device, which is arranged opposite thereto, while the heating is carried out in the heating chamber region.

Advantageously, this auxiliary heating device can be embodied as a radiation heater, wherein specific material characteristics of the solder material carrier can be considered by means of a temperature control of the auxiliary heating device.

The device for carrying out the afore-described method according to the invention encompasses a heating device and a cooling device arranged in two chamber regions which can be separated from one another by means of a condensation device.

As already stated above with reference to the method according to the invention, it proves to be advantageous with reference to the realization of the device according to the invention if the condensation device is provided with a cooling device.

If the cooling device is embodied in such a manner that it interacts with the condensation device at least in the supply position thereof, it is possible, on the one hand, to use the cooling device in a particularly effective manner, thus in a phase of the method in which the condensation device is substantially located outside of the field of impact of the heating chamber region. On the other hand, it is possible to arrange the cooling device itself outside of the process chamber so that an undesired condensate precipitation on the cooling device, which could have a negative impact on the efficiency of the cooling device, can substantially be omitted.

A particularly advantageous embodiment of the condensation device becomes possible if it is embodied as a metallic separating wall device. Through this, the condensation device encompasses an advantageously large heat capacity on the one hand and, on the other hand, a particularly space-saving embodiment of the condensation device is possible. This applies in particular if the condensation device is embodied as a separating plate.

If the condensation device is embodied in such a manner that, with the condensation device being arranged in the separating wall position, a gas passage is embodied, which connects the chamber regions of the process chamber with one another so that they communicate with one another, a gas exchange between the chamber regions becomes possible despite the shielding effect of the condensation device, which suppresses a condensate precipitation in the cooling chamber region.

A particularly effective embodiment of the gas passage is in effect if a separating wall gap, which connects the chamber regions with one another so as to make them communicate with one another, is embodied between the condensation device which is arranged in the separating wall position, and a chamber wall of the process chamber, so that, on the one hand, a sufficient gas exchange is possible across the entire gap surface, on the other hand, however, the condensate mass can be effectively prevented from passing the gap due to the separating wall gap being provided with a labyrinth cross section.

Independently of the embodiment of the condensation device, it is advantageous at any rate if an auxiliary heating device is arranged opposite to the heating device in the heating chamber region of the process chamber so that, during the heating of a solder material carrier, said solder material carrier can be arranged between the heating device and the auxiliary heating device.

The execution of a variant of the method according to the invention will be specified in more detail below by means of a possible embodiment of the device according to the invention with the aid of the drawings.

Figure 1:
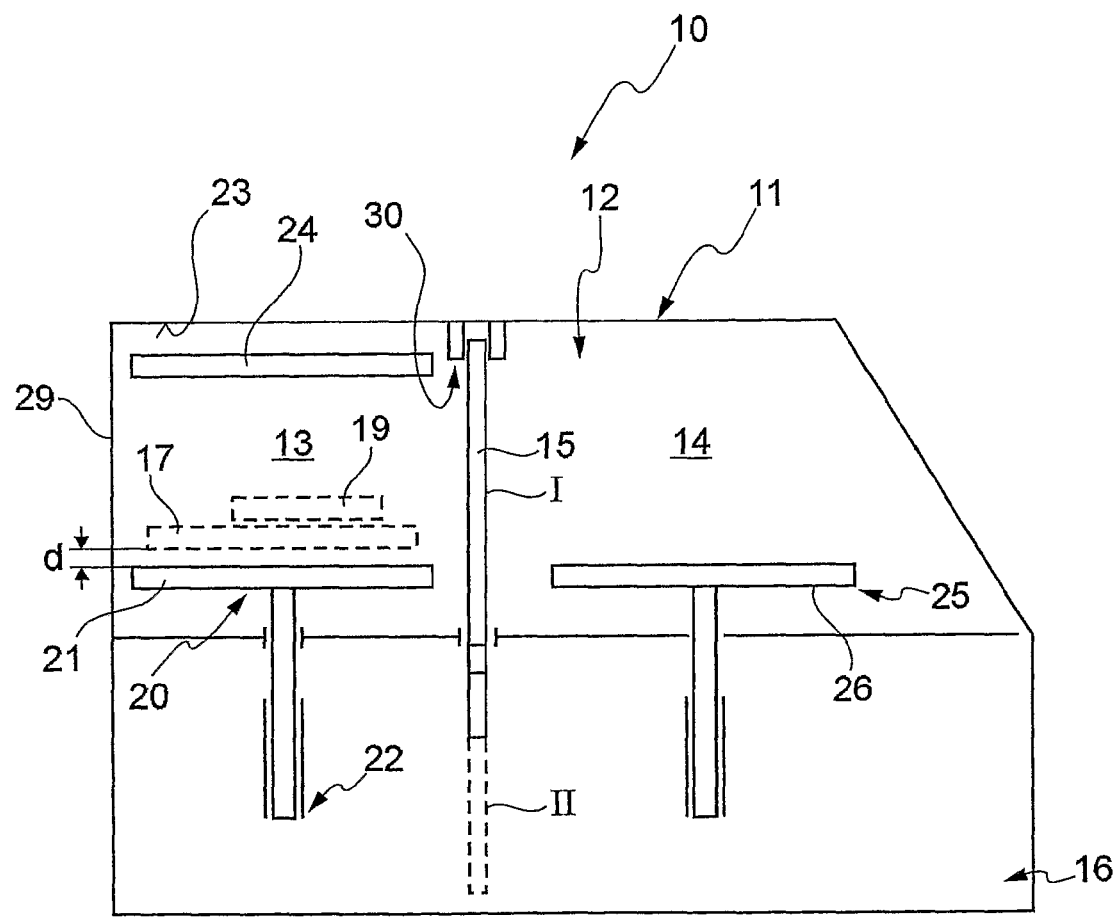
FIG. 1 shows a soldering device in a stationary operating state.

FIG. 1 shows a soldering device 10 comprising a housing 11 in which a process chamber 12 is embodied. The process chamber 12 encompasses a first heating chamber region 13, which is illustrated on the left-hand side in the exemplary embodiment, and a second cooling chamber region 14 on the right-hand side thereof. Provision is made between the heating chamber region 13 and the cooling chamber region 14 for a separating wall device, which is embodied as a separating plate 15 in the exemplary embodiment shown and enables a separation of the heating chamber region 13 from the cooling chamber region 14. To activate or deactivate the effect of the separating plate 15 which separates the heating chamber region 13 from the cooling chamber region 14, said separating plate 15 can be displaced from a separating wall position I, which is illustrated in FIG. 1, into a supply position II, which is illustrated in FIG. 1 by means of a dot and dash line. Depending on the embodiment of the housing, the supply position II can be arranged within or outside of the process chamber, for example in a lower housing part 16.

As is further shown in FIG. 1, a heating device 20, which in the present case encompasses a resistance-heated heating plate 21 and the distance d of which can be changed with respect to the component carrier 17 by means of a feed device 22, is located in the heating chamber region 13. The feed device 22 enables a surface contact between the heating plate 21 and a component carrier 17, which is illustrated in FIG. 1 by means of a dot and dash line, as well as the setting of a defined distance d between the heating plate 21 and the component carrier 17, so as to thus set the desired temperature of the component carrier 17 and thus of a substrate 19 which is arranged on the component carrier.

In addition to the heating device 20, an auxiliary heating device 24 is located above the component carrier 17 and below a ceiling wall 23 of the process chamber 12.

A cooling device 25, which in the exemplary embodiment illustrated in FIG. 1 encompasses a cooling plate 26 through which a coolant flows, is located in the cooling chamber region 14. To set a cooling temperature, the cooling plate 26 interacts, in accordance with the heating plate 21, with a component carrier 17 arranged thereon.

As is illustrated in FIG. 1, the process chamber 12, in the region of the cooling chamber region 14, is provided with an access opening 28 (FIG. 2), which can be closed by means of a lid device 27. In the stationary operating state of the soldering device 10, which is illustrated in FIG. 1, the access opening 28 is closed by means of the lid device 27. A substrate is initially not located in the process chamber 12 in this initial state. The heating chamber region 13 and the cooling chamber region 14 are separated from one another in an air-tight, in other words in an optically tight, manner by means of the separating plate 15 being arranged in its separating wall position, except for a gas passage which remains in a wall gap 30 which in the exemplary embodiment illustrated in FIG. 1 is embodied as a labyrinth gap and runs between the ceiling wall 23 and a side wall 29. In this configuration, the heating chamber region 13 and the cooling chamber region 14 can be tempered to the respectively desired temperature and can be held constant at this temperature.

Figure 2:
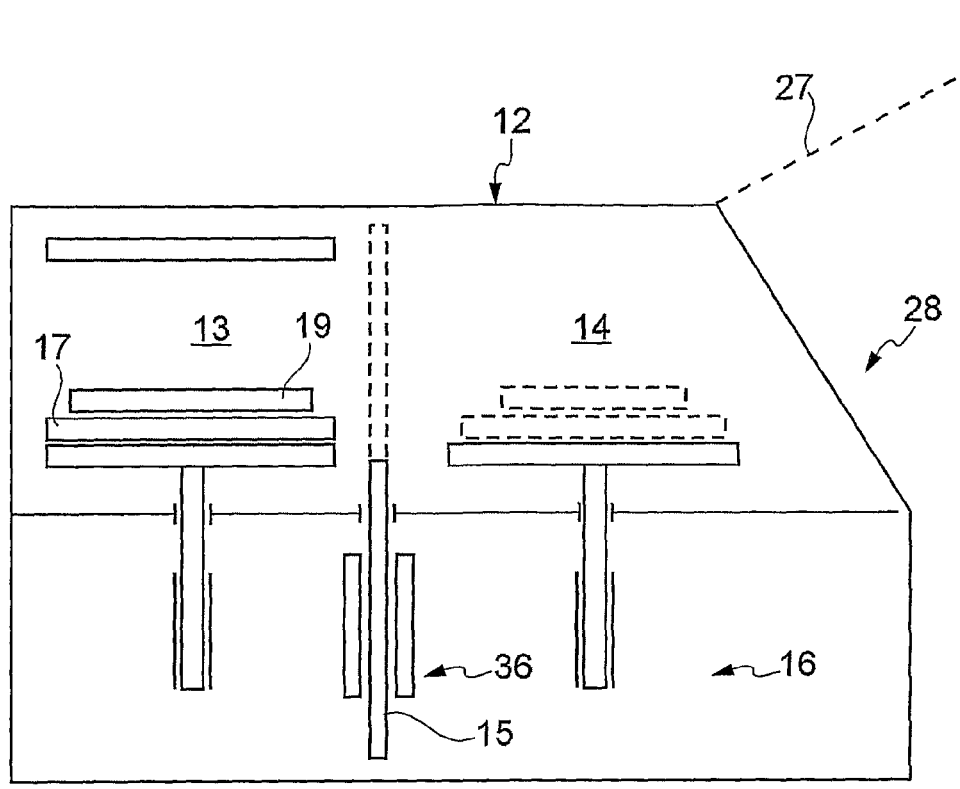
FIG. 2 shows the soldering device illustrated in FIG. 1 in a feed and transfer phase.

In the feeding and transfer phase illustrated in FIG. 2, the lid device 27 is opened for releasing the access opening 28, and the substrate 19, which, for soldering purpose, is provided for example with a pasty solder material, is introduced into the cooling chamber region 14 (dashed). After the displacement of the separating plate 15 into its supply position illustrated in FIG. 2, the substrate 19 is introduced into the heating chamber region 13 by means of the component carrier 17 (continuous line). For the transfer between the heating chamber region 13 and the cooling chamber region 14, provision can be made for a transfer device for the component carrier 17 arranged in the process chamber 12.

Figure 3:
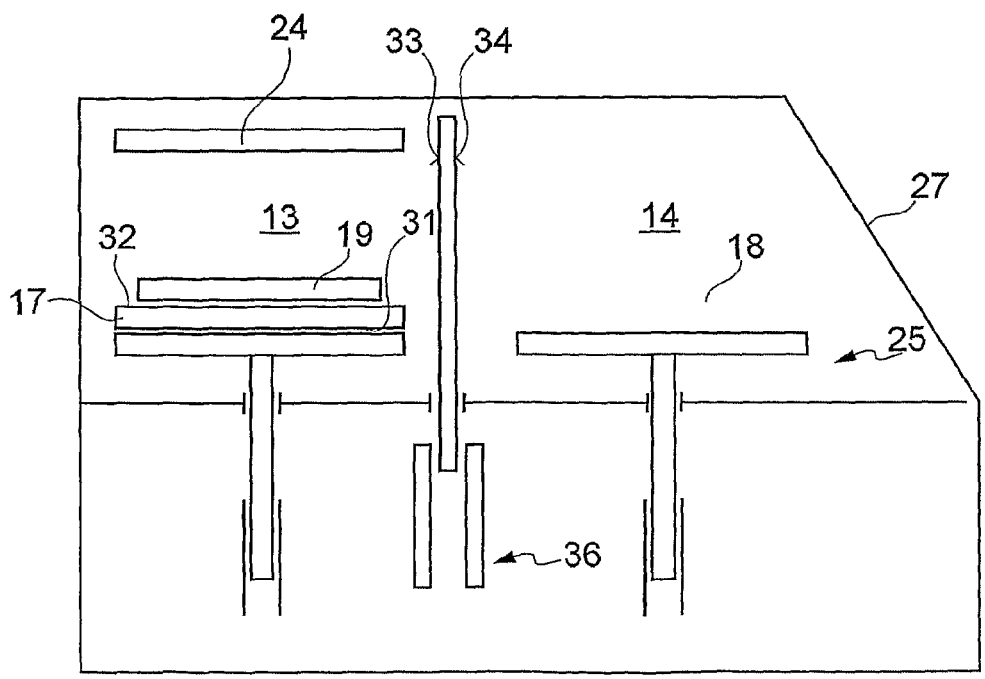
FIG. 3 shows the soldering device illustrated in FIG. 1 during the heating of the solder material carrier in the heating chamber region.

In the subsequent heating phase, which is illustrated in FIG. 3, the separating plate 15 is again transferred into its separating wall position. For guiding the separating plate 15, provision is made, in the exemplary embodiments of the soldering device 10 illustrated in FIGS. 2 and 3, in the region of the lower housing part 16 for a feed device 36. To be able to attain the smallest possible temperature gradient between a lower substrate side 31 and an upper substrate side 32, depending on the material strength and the material characteristic of the substrate 19 arranged in the heating chamber region 13 for soldering purposes, the temperature of the auxiliary heating device 24, by means of which it acts on the substrate 19 via radiation, is set in a substrate-specific manner. Contrary thereto, the desired set point temperature of the component carrier 17 mainly conforms to the solder material composition.

In the heating phase illustrated in FIG. 3, in which the separating plate 15 is located in its separating wall position, the separating plate 15 serves as a condensation device in such a manner that vapors, which are released during the melting of the solder material and which contain volatile components of the solder material, are precipitated on the surface of the separating plate 15, which serves as a condensation surface 33. The temperature gradient which is necessary for the condensation on the surface of the separating plate 15 is already attained in that the separating plate 15 is cooled to a cooling temperature which acts on a cooling surface 34 of the separating plate 15 in the cooling chamber region 14. Due to the fact that a condensate formation already takes place on the separating plate 15 which acts as a condensation device, it is ensured that a corresponding precipitation is avoided in the cooling chamber region 14 and on the cooling device 25, respectively. The formation of the separating wall gap 30 at the same time enables the formation of a vacuum in the heating chamber region 13 during the heating of the substrate 19 and during the melting of the solder material arranged on the substrate 19, respectively, without thus having corresponding vacuum forces, which could impair a displacement of the separating plate 15 between the supply position and the separating wall position, act on the separating plate 15

A further increase of the condensation output on the condensation surface 33 of the separating plate 15 is made possible if, in addition to the retral impingement of the cooling surface 34 of the separating plate 15 by the temperature formed in the cooling chamber region 14, a direct cooling of the separating plate 15 takes place via a condenser cooling device arranged in the lower housing part 16. The condenser cooling device can be realized by means of a cooled embodiment of the feed device 36 of the separating plate 15.

Figure 4:
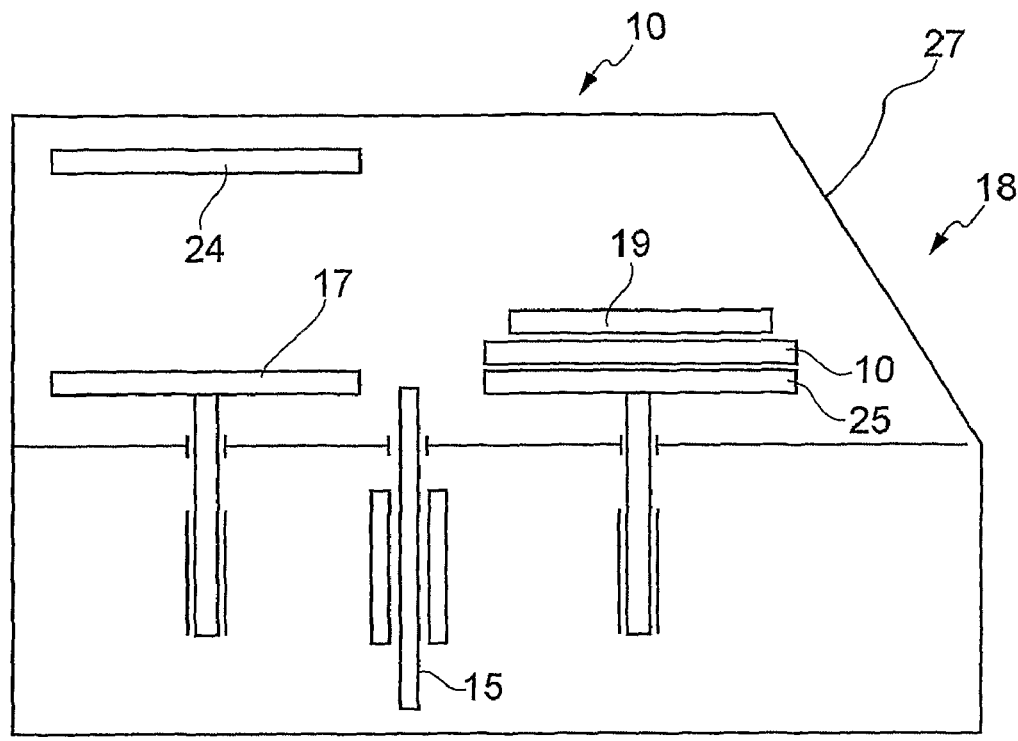
FIG. 4 shows the soldering device illustrated in FIG. 1 during the transfer of the solder material carrier into the cooling chamber region.

FIG. 4 shows the soldering device 10 in the transfer phase, in which the substrate 19, after displacement of the separating plate 15 into its supply position in which the separating plate 15 is substantially located in the lower housing part 16, is transferred from the heating chamber region 13 into the cooling chamber region 14 by means of the component carrier 17.

Figure 5:
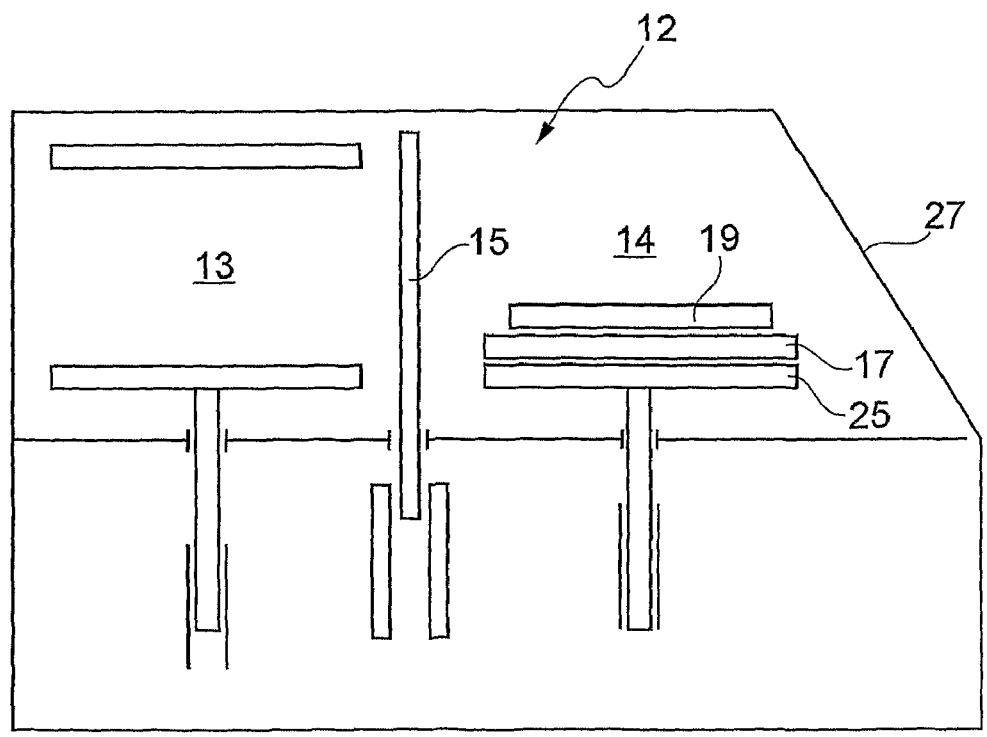
FIG. 5 shows the soldering device illustrated in FIG. 1 during the cooling of the solder material carrier in the cooling chamber region.

Finally, FIG. 5 shows the soldering device 10 in the subsequent cooling phase, in which, in a situation where the lid device 27 is still closed and the separating plate 15 has been moved back into its separating wall position, the substrate 19 is located on the cooled component carrier 17 while being simultaneously shielded by the separating plate 15 from a heat emission from the heating chamber region 13. After the substrate 19 has been cooled, the lid device 27 can be opened and the operator can remove the substrate 19 through the access opening 28 of the soldering device 10. To continue the soldering method on a subsequent substrate, said substrate can now be reintroduced into the cooling chamber region 14, as is illustrated in FIG. 2, and can be transferred into the heating chamber region.

The invention claimed is:

1. A device for producing a solder connection between a solder material and a component, the device comprising:
    a process chamber being sealed from the surrounding area;
    a heating device located in the process chamber for heating the solder material carrier;
    a condensation device located in the process chamber wherein the condensation device may be positioned in a separating wall position in the process chamber;
    a cooling device located in the process chamber for cooling the solder material carrier, wherein the heating device is located in a first region of the process chamber and the cooling device is located in a second region of the process chamber wherein the first region can be separated from the second region by the condensation device; and
    a gas passage coupling the first and second regions of the process chamber so that the regions may communicate with one another when the condensation device is in its separating wall position in the process chamber.

2. The device according to claim 1, wherein the condensation device can be displaced from a first supply position which provides access between the first and second regions to a second, separating wall position which separates the first and second regions.

3. The device according to claim 2, wherein the supply position is located outside of the process chamber.

4. The device according to claim 2, wherein the condensation device includes a cooling device.

5. The device according to claim 4, wherein the cooling device interacts with the condensation device at least when the condensation device is in the supply position.

6. The device according to claim 1, wherein the condensation device is a metallic separating wall.

7. The device according to claim 6, wherein the condensation device is a separating plate.

8. The device according to claim 1, further comprising a separating wall gap coupling the first and second chamber regions with one another so that they may communicate with one another, wherein the gap is between the condensation device when it is in its separating wall position and a chamber wall of the process chamber.

9. A method for the temperature treatment of a component in a process chamber sealed from an external environment to produce a solder connection between a solder material and the component, the method comprising the steps of:
    providing a condensation device in the process chamber wherein the condensation device may be positioned in a separating wall position in the process chamber;
    heating the component in a first region of the process chamber to melt the solder material arranged on a solder material carrier;
    cooling the component in a second region of the process chamber wherein the first and second regions of the process chamber can be separated from one another by the condensation device; and coupling the first and second regions of the process chamber by a gas passage so that the regions may communicate with one another when the condensation device is in its separating wall position in the process chamber.

10. The method according to claim 9, wherein the heating step is carried out by a heating device and the cooling step is carried out by a cooling device, which are each operated at a substantially constant temperature.

11. The method according to claim 9, further comprising the step of, prior to the step of heating of the solder material carrier, displacing the condensation device from a supply position to a separating wall position to separate the first region from the second region.

12. The method according to claim 11, further comprising the step of cooling the condensation device at least when it is in its supply position.

13. The method according to claim 9, further comprising the step of applying a vacuum to the first region during the heating step which is separated from the second region by the condensation device.

14. The method according to claim 13, further comprising the step of applying a protective gas to either or both the second region and the first region while the vacuum is applied to the first region.

15. The method according to claim 13, wherein the solder material carrier is arranged between a heating device and an auxiliary heating device arranged opposite thereto during the heating of the solder material carrier in the first region by the heating device.

* * * * *